(12) United States Patent
Bauchot et al.

(10) Patent No.: US 7,143,338 B2
(45) Date of Patent: Nov. 28, 2006

(54) METHOD AND SYSTEM IN AN ELECTRONIC SPREADSHEET FOR HANDLING ABSOLUTE REFERENCES IN A COPY/CUT AND PASTE OPERATION ACCORDING TO DIFFERENT MODES

(75) Inventors: Frederic Bauchot, St Jeannet (FR); Albert Harari, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1357 days.

(21) Appl. No.: 09/812,202

(22) Filed: Mar. 19, 2001

(65) Prior Publication Data

US 2001/0032214 A1    Oct. 18, 2001

(30) Foreign Application Priority Data

Apr. 14, 2000    (EP) .................................. 00480033

(51) Int. Cl.
*G06F 15/00*    (2006.01)
*G06F 17/00*    (2006.01)

(52) U.S. Cl. ...................... 715/503; 715/538; 715/539; 715/530; 715/504

(58) Field of Classification Search ................ 715/503, 715/504, 530, 538
See application file for complete search history.

(56) References Cited

U.S. PATENT DOCUMENTS

| | | | | |
|---|---|---|---|---|
| 5,416,895 A | * | 5/1995 | Anderson et al. | 715/503 |
| 5,499,180 A | * | 3/1996 | Ammirato et al. | 715/503 |
| 5,502,805 A | * | 3/1996 | Anderson et al. | 715/503 |
| 5,553,215 A | * | 9/1996 | Kaethler | 715/503 |
| 5,590,259 A | * | 12/1996 | Anderson et al. | 715/503 |
| 5,604,854 A | * | 2/1997 | Glassey | 715/503 |
| 5,664,127 A | * | 9/1997 | Anderson et al. | 345/776 |
| 5,742,835 A | * | 4/1998 | Kaethler | 715/503 |
| 5,874,952 A | * | 2/1999 | Morgan | 345/835 |
| 6,157,935 A | * | 12/2000 | Tran et al. | 715/503 |
| 6,202,060 B1 | * | 3/2001 | Tran | 707/3 |
| 6,282,551 B1 | * | 8/2001 | Anderson et al. | 715/503 |

FOREIGN PATENT DOCUMENTS

EP    0569133 A2    11/1993

OTHER PUBLICATIONS

Person, R. "Using Excel Version 5 for Windows, Special Edition" David P. Ewing, Que Corporation, XP-002233251 Chap. 7 "Moving or Copying Data and Formulas" pp. 235-241, 1993.
Soucie, R. "Excel Professional Techniques" David P. Ewing, Que Corporation, XP-002233252 Part I "Getting a Grip" pp. 100-102, 1994.

* cited by examiner

*Primary Examiner*—Heather R. Herndon
*Assistant Examiner*—N Hillery
(74) *Attorney, Agent, or Firm*—William H. Steinberg, Esq.; Greenblum & Bernstein P.L.C.

(57) ABSTRACT

In an electronic spreadsheet, if an absolute cell or absolute cell range reference does not comprise the same information in a source environment and in a destination environment, errors may occur. Therefore, a buffer is created for temporarily storing a source cell range. Any material in the buffer not needed, is cleared. Any absolute reference content remaining that points to a source cell range, has a relative position within the source cell range determined. Then, a corresponding absolute reference within the destination cell range is determined. Prior to copying the buffer content into corresponding cells within a destination cell range, each absolute reference pointing to a source is replaced by a corresponding absolute reference with the destination cell range.

4 Claims, 7 Drawing Sheets

| Page A | A | B | C | D | E | F |
|---|---|---|---|---|---|---|
| 1 | | | | | | |
| 2 | | International Gardening XYZ Corp. | | | | |
| 3 | | | | | | |
| 4 | | Monthly Sales Report | | | | |
| 5 | | | | Period: | | Jan. 2000 |
| 6 | | | | Country: | | France |
| 7 | | | | Euro Exchange rate: | | 6,55957 |
| 8 | | | | | | |
| 9 | Product | Unit price (French F) | Quantity | Revenue (French F) | Revenue (Euro) | |
| 10 | Rake | 100 | 18 | 1 800 | 274,41 | |
| 11 | Shovel | 80 | 22 | 1 760 | 268,31 | |
| 12 | Hatchet | 55 | 38 | 2 090 | 318,62 | |
| 13 | TOTAL | | | 5 650 | 861,34 | |

- 401 Wait for Self-Contained_Paste command
- 402 Self-Contained_Paste command detected (key or push-button or any other trigger)
- 403 Copy the (top, left, foreground) cell from clipboard to a memory working buffer
- 404 Parse content of the memory working buffer from left to right
- 405 Absolute Reference found in the memory working buffer?
  - NO → (back to 404 loop / next step)
  - YES → 406 Absolute Reference points within source range?
    - NO → back to 404
    - YES → 407 In memory working buffer, change the last found Absolute Reference to point within the destination range.
- 408 Copy the memory working buffer in the corresponding destination range cell
- 409 Last cell of the clipboard visited?
  - NO → 410 Copy the next cell of the clipboard to the memory working buffer → back to 404
  - YES → back to 401

METHOD AND SYSTEM IN AN ELECTRONIC SPREADSHEET FOR HANDLING ABSOLUTE REFERENCES IN A COPY/CUT AND PASTE OPERATION ACCORDING TO DIFFERENT MODES

TECHNICAL FIELD OF THE INVENTION

The present invention relates to the field of information processing by digital computers, and more particularly to a method and system, in an electronic spreadsheet, for handling absolute references during a copy & paste operation or during a cut & paste operation.

BACKGROUND ART

Before computers, numerical analyses, particularly financial ones, were usually prepared on an accountant's columnar pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a connex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output. Cell ranges are used to automate the computations in a spreadsheet. Whether cells or cell ranges are named or not, they can be referenced within a formula either by a "relative" or an "absolute" reference. Such a reference can be the address of the referenced cell (or cell range), or the name of the cell (or cell range) if it turns that this cell (or cell range) is named.

With a relative reference, the cell (or cell range) is determined from the position (relative address) of the cell hosting the reference.

With an absolute reference, the cell (or cell range) is determined from its absolute position (absolute address) within the spreadsheet.

When a cell comprising a formula with one or a plurality of relative and/or absolute cell (or cell range) references, is first cut or copied and then pasted into another cell address, the content of the cut or copied cell (also called source cell) is transferred to the pasted cell (also called destination cell) with the one or the plurality of relative and/or absolute cell (or cell range) references. The relative references point to cells (or cell ranges) determined from the position of the pasted cell, while the absolute references point to the same locations as the ones pointed by the absolute references in the source cell. Such locations can be:

either within the source environment (as implemented by the Lotus Corp. tool 123), or within the destination environment (as implemented by the Microsoft Corp. tool Excel).

When such an absolute cell (or cell range) reference is no longer visible from the pasted cell (for instance because the absolute cell (or cell range) reference and the pasted cell belong to different files and the file hosting the referenced cell (or cell range) is closed), then the formula results into an error in the first case. When an absolute cell (or cell range) reference does not comprise the same information in the source environment and in the destination environment, the value taken by the formula in the pasted cell has a high probability to be wrong. The only way to avoid such errors with conventional means would be to do a paste "by value" operation where formulas are replaced by the value they take. However, this operation is detrimental because it leads to a loss of dynamicity and flexibility.

SUMMARY OF THE INVENTION

The present invention relates to the field of information processing by digital computers, and more particularly to a method and system, in an electronic spreadsheet, for handling absolute cell or cell range references within formulas comprised in cells that are cut or copied and then pasted from one environment (a file for instance) into another environment. The method of processing one or a plurality of absolute cell references or cell range references during a copy/cut and paste operation in a multi dimensional spreadsheet comprising a plurality of cells identified by addresses or names, comprises the steps of:

performing a "regular" cut or copy operation, said operation comprising the steps of:

selecting a source cell range to cut and paste or to copy and paste into a destination cell range;

storing in a working buffer the content of each cell that belongs to said source cell range;

clearing the content of each cell that belongs to a source cell range to cut;

performing a so-called "self-contained paste" operation, said operation comprising for each cell stored in the working buffer, the further steps of:

if the content of the stored cell comprises one or a plurality of absolute references pointing to a cell or a cell range belonging to the source cell range:

determining for each of said cells or cell ranges pointed by an absolute reference and belonging to the source cell range, a relative position within the source cell range;

determining for each of said relative position within the source cell range, a corresponding absolute reference within the destination cell range;

replacing within the stored cell, each absolute reference pointing to a cell or a cell range belonging to the source cell range by the corresponding absolute reference within the destination cell range;

copying the content of each cell stored in the buffer to corresponding cells within the destination cell range.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

System Hardware

Figure 1A:
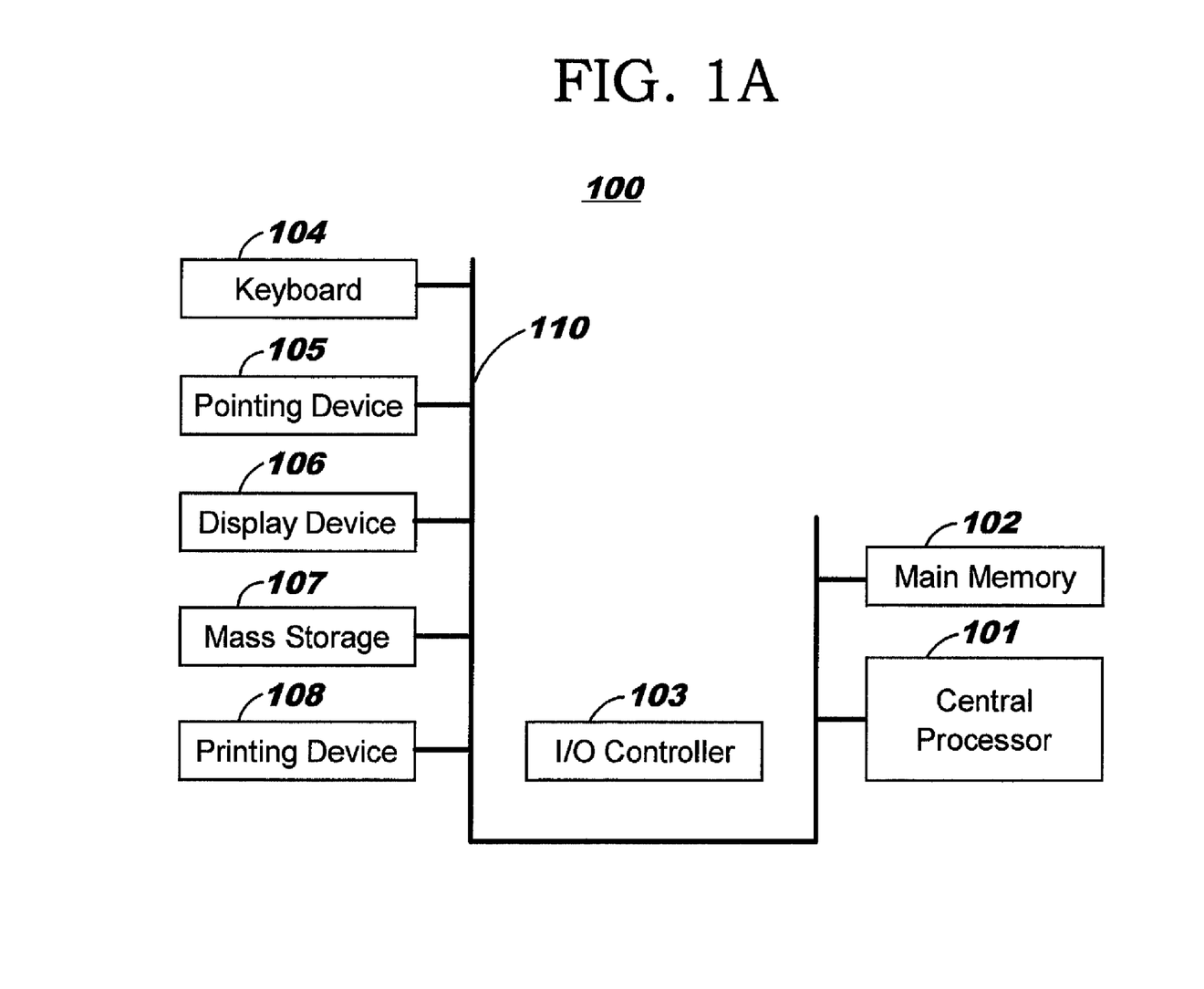
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
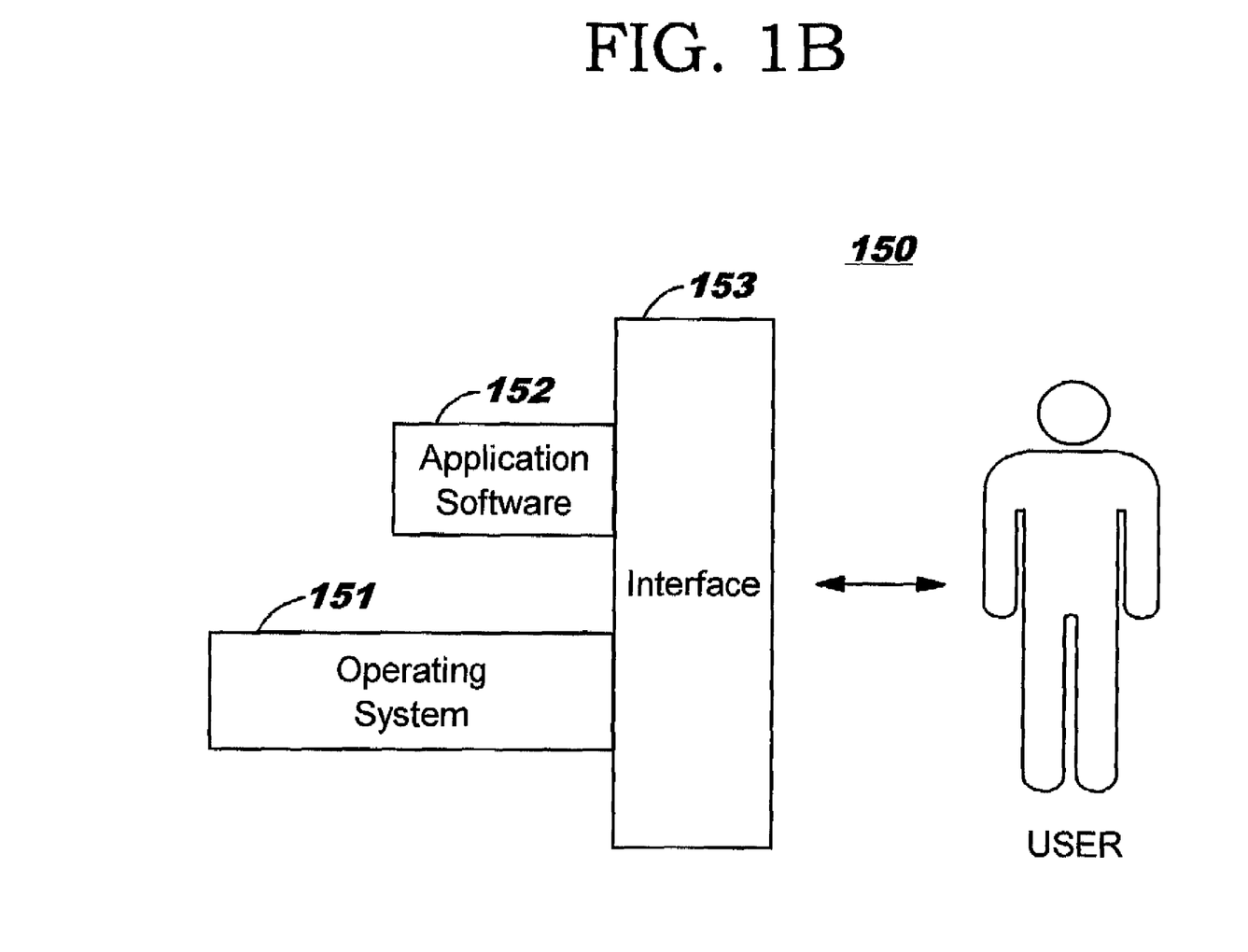
FIG. 1B is a schematic view a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
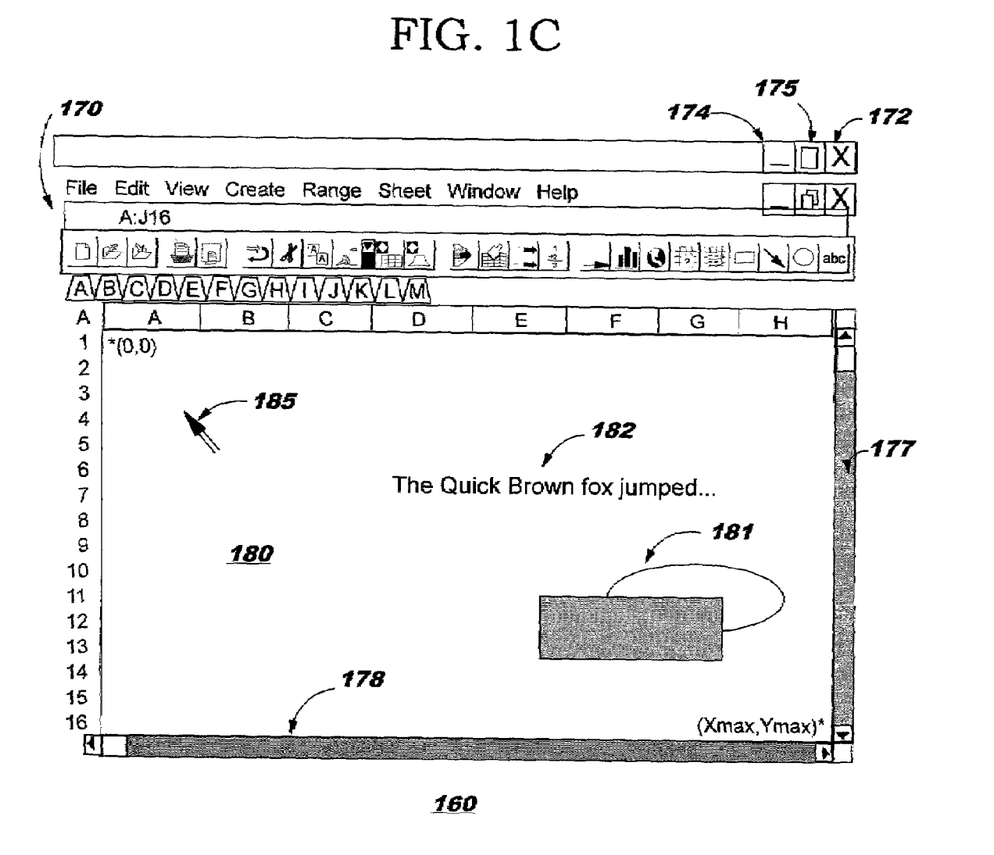
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
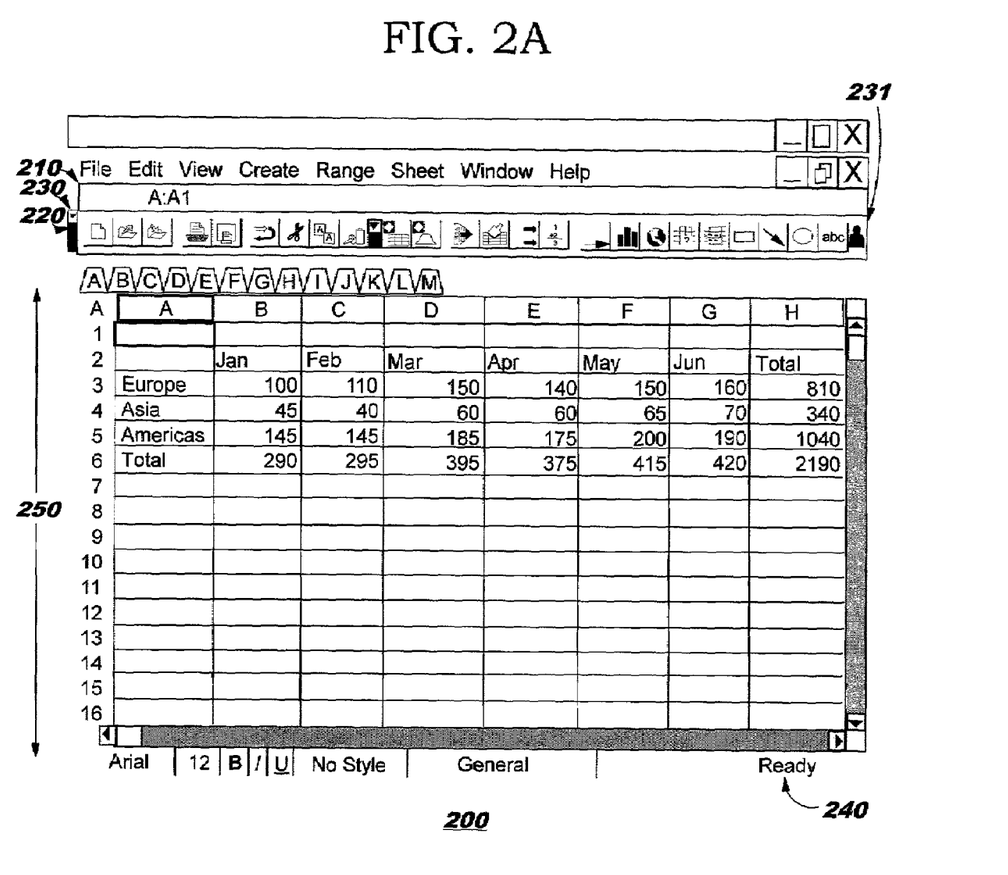
FIG. 2A shows a spreadsheet notebook interface according to the preferred embodiment of the present invention.

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
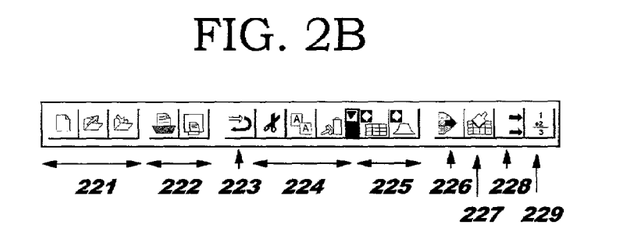
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column resizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
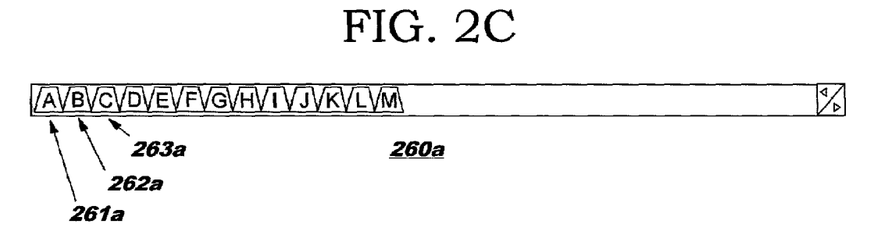
FIGS. 2C and 2D show page identifiers for rapidly accessing and manipulating individual pages of the notebook interface shown in FIG. 2A.
Figure 2D:
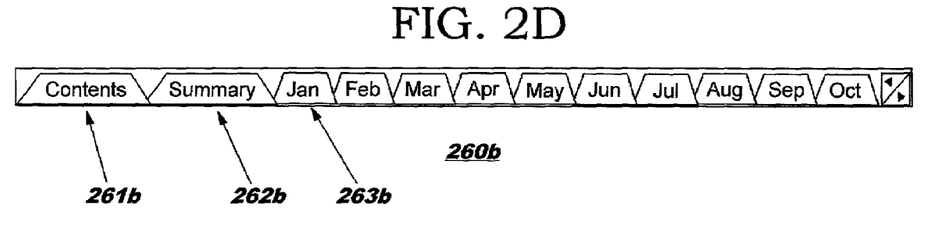

As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Management of Absolute References During a Paste Operation

A. Introduction

Cell ranges are used to automate the computations in a spreadsheet. Cell or cell ranges can be referenced within a formula either by a "relative" or an "absolute" cell or cell range reference. Such a cell (or cell range) reference can be the address of the referenced cell (or cell range), or the name of the referenced cell (or cell range) if it turns that this cell (or cell range) is named. In the following, for more readability, we will assume that the reference is the cell (or cell range) address, but the same results would be achieved by using the cell (or cell range) name instead.

Relative References

Figure 3:
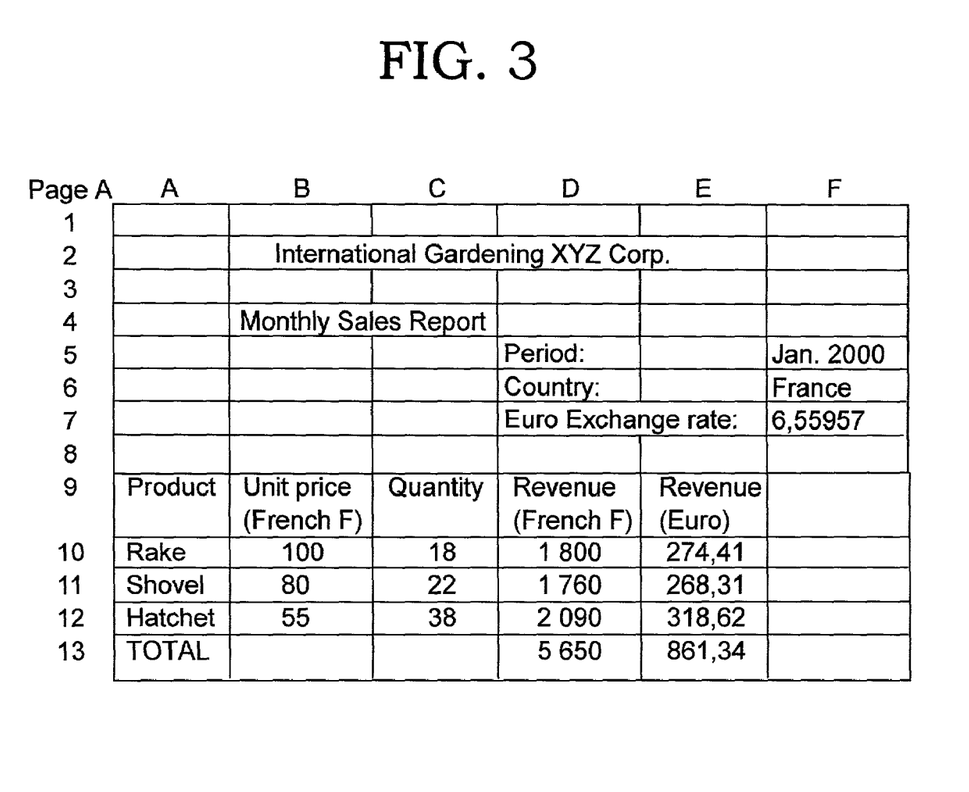
FIG. 3 illustrates a typical spreadsheet structure used in the preferred embodiment of the present invention.

When using relative references in a formula comprised within a given cell, the cell (or cell range) is identified by its relative position to the given cell. For instance let consider the cell with address "A:D10". If this cell contains the formula "A:B10*A:C10", it means that the value of this cell will be the result of the multiplication of the two cells located immediately on his left (columns B and C), on the same row (row 10), within the same page (page A). The use of such relative references is quite powerful for building some structured table because the same relationship can be established across table elements. With the same example as above, if the cell at address "A:D10" is copied on the cell below it (whose address is "A:D11"), it will hold the formula "A:B11*A:C11" just because it corresponds also to the result of the multiplication of the two cells located on the same row (11), on the same page (A), and on the immediately left columns (B and C). For instance within a structured Country Sales Report Table, as illustrated in FIG. 3, column A is filled with the names of sold products, column B is filled with the unit price (in local currency) of the products, column C is filled with the quantity of sold products and column D gives, thanks to the above formula, the revenue for the sold products (in local currency).

Absolute References

When using absolute references in a formula contained within a given cell, the referenced cell (or cell range) is identified by its position within the entire spreadsheet. For instance let consider in the above example illustrated in FIG. 3, the cell with address "A:E10": This cell belongs to the column filled with the revenue of the sold products, using the Euro currency. If this cell contains the formula "A:D10/$A:$F$7", it means that the value of this cell will be the result of the division of the cell located immediately on his left (column D), on the same row (row 10), within the same page (page A), by the cell located on row 7, column F, page A, and which holds the French Franc to Euro exchange rate. The presence of the dollar sign ("$") is a classical naming convention telling that the address of the cell "A:F7" is used as an absolute reference. Combining such relative and absolute references is even more powerful for building some structured table because the same relationship can be established across table elements. With the same example as above, if the cell at address "A:E10" is copied on the cell just below it (whose address is "A:E11"), it will hold the formula "A:D11/$A:$F$7" just because it corresponds also to the result of the division of the cell located on the same row (11), on the same page (A), and on the immediately left column (D) by the cell on row 7, column F, page A. As the cell at address A:F7 was referenced by an absolute reference ("$A:$F$7") in the cell "A:E10", it is also referenced by an absolute reference within the formula of the cell "A:E11".

Let now assume that the user of the previously introduced spreadsheets wishes to consolidate different monthly sales reports coming from different countries, each of them being structured according to the above format. A straightforward approach would be to create a consolidation spreadsheet on which will be copied/pasted each of the country sales reports (for instance the range "A:A4 . . . A:F13"). When such an operation is performed, conventional electronic spreadsheets offer the possibility to copy/paste the content of cells (that is the default mode where formulas are copied as described above), or the value of cells (in this case the value taken by a formula replaces the formula itself). In the scenario dealing with monthly sales reports consolidation, none of these two methods is satisfactory for the following reasons:

1. When the content of cells is copied/pasted, any absolute reference is kept unchanged, meaning that it points within the destination cell range to the same cell as the one pointed in the original source range. This has been implemented in two flavours by products like 123 from Lotus Corp. or Excel from Microsoft Corp., depending on the environment (source or destination) the cell range belongs to. If, in the consolidation file, the cell corresponding to the copy of the cell whose address is "A:E10" in the source file (with assumed file name "France Report January 2000.xyz"), is located at address "C:E133". The formula found at this address will be, with classical naming conventions:

"C:D133/<<France Report January 2000.xyz>>$A:$E$7" when the spreadsheet is operated by the tool 123, and "C:D133/$A:$E$7" when the spreadsheet is operated by the tool Excel.

As soon as the original source range becomes no longer visible to the destination one (for instance when the file holding the France sales report is closed), then the referenced range cannot be resolved in the 123 tool case, resulting in an error. In this case the formula is still "C:D133//<<France Report January 2000.xyz>>$A:$E$7" but the value of the cell becomes "ERR". In the Excel case, the cell with address "A:E7" in the consolidation file does not necessary carry the same information (French Franc to Euro exchange rate) as in the original file. For instance if this cell is zeroed, then the formula will also display "ERR" (divide by zero), or even worse, if this cell carries any valid number, then the formula provides an erroneous result, without showing any error.

2. When the value of cells is copied/pasted by value, then the formulas are all replaced by their respective values, meaning that the power brought by automatic computation is lost. This is very detrimental because one of the main reasons to use automatic spreadsheets is to take advantage of the automation means offered by imbedded formulas.

The present invention offer a user-friendly solution to this problem for all the absolute references which are part of the pasted range. Indeed in such a case, the information carried by such cells are pasted in the destination environment, so that it is possible to rely on them safely.

B. Scenario

In contrast to just-described conventional tools, the present invention provides a more powerful, user-friendly and interactive approach for handling absolute references during a cut/copy and paste operation, in a form of a so-called "Self-Contained Paste" method.

In a preferred embodiment, the present invention is used in two steps:

1. The first step occurs when the spreadsheet user decides, based on some criteria not detailed here, whether a given range of cells have to be cut or copied to memory (the underlying memory space being known as the clipboard).

The user first selects the relevant range of cells by using the pointing device 105 or the keyboard 104 and then invokes the conventional commands called "Copy" or "Cut" thanks to conventional means available in spreadsheet environment, such as (but not limited to) dedicated push-buttons, keyboard entry short cuts, menu or sub-menu entries.

At completion of one of these two conventional commands, the selected range of cells has been copied by conventional internal routines of spreadsheet program into the memory 102 of the computer system.

2. The second step occurs when the spreadsheet user decides, based on his or her own criteria not detailed here, to take advantage of the present invention by invoking an original command "Self-Contained Paste" thanks to conventional means available in spreadsheet environment, such as (but not limited to) dedicated push-buttons, keyboard entry short cuts, menu or sub-menu entries.

C. Self-Contained_Paste Method

Figure 4:
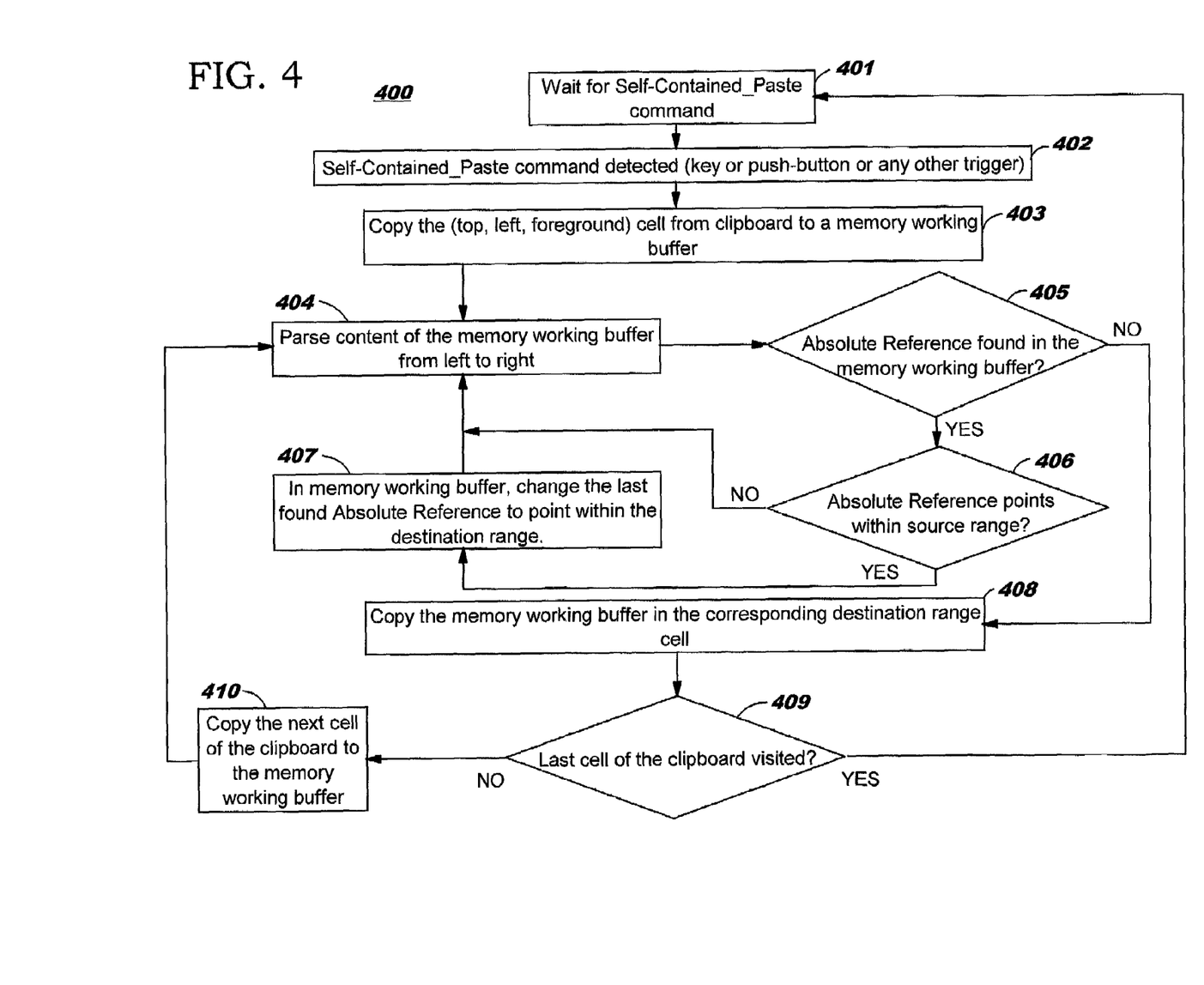
FIG. 4 is a flow chart illustrating a preferred method for handling absolute references during a paste operation according to the present invention.

The method for handling absolute references during a paste operation to take advantage of the present invention is summarised in flowchart 400 of FIG. 4. This method can be seen as the processing of the "Self-Contained Paste" command. The method comprises the following steps:

At step 401, the method is in its default state, waiting for an event to initiate the process.

At step 402, an event is detected, as a result of an user action. This action can be for instance a specific combination of key on the keyboard 104, or the click of the pointing device 105 on a specific button, or any other similar means not further specified here.

At step 403, the first cell found in memory clipboard (typically corresponding to the top, left foreground cell) is copied within a working buffer in memory. Subsequent operations performed on the content of the cell will be done within this buffer.

At step 404, the content of the memory working buffer is parsed from left to right, by using conventional parsing methods not detailed here.

At step 405, a test is performed to detect, while parsing, if any absolute reference is found within the content of the memory working buffer. If it is the case, then control is given to step 406, otherwise control is given to step 408.

At step 406, a test is performed on the absolute reference found at step 405 to determine if this reference points to a cell which is part of the whole source cell range, that is the cell range which has been cut or copied to the clipboard. If it is the case, then control is given to step 407, otherwise control is given to step 404 for further parsing from left to right the rest of the content of the memory working buffer.

At step 407, the content of the memory working buffer is updated to change the absolute reference identified at steps 405 and 406, so that it points within the pasted range to the cell whose relative position within this pasted range matches the relative position of the original absolute reference within the source cell range.

When step 408 is reached, the whole content of the memory working buffer has been parsed (step 404) and all potential absolute references pointing within the source cell range have been updated (steps 405, 406 and 407). It is time now to copy the content of the memory working buffer within the destination cell range (i.e. the pasted cell range) at the cell location matching the relative position of the last cell copied from the clipboard to the memory working buffer. This memory to pasted cell range relative position matching is implementation dependent and can rely on conventional techniques and classical means not detailed here.

At step 409, a test is performed to check if the last cell of the clipboard has been treated according to the previous steps (404 to 408 included). This test implicitly assumes that the clipboard cells are ordered, and the present invention does not make any assumption on the way this ordering is implemented. If the last cell has been visited, then it means that all the cells have been treated, so that control can be given back to the initial step 401, for processing any further new command. If it is not the case, then control is given to step 410.

At step 410, the next cell found in the clipboard is copied onto the memory working buffer for being treated according to the logic described in steps 404 to 409. The determination of the next cell relies here also on some cell ordering method on which the present invention does not make any assumption.

Alternate Embodiments

While the invention has been particularly shown and described with reference to a preferred embodiment, it will be understood that various changes in form and detail may be made therein without departing from the spirit, and scope of the invention.

The Self-Contained_Paste method and system according to the present invention may be used advantageously in those environments where elements of information are organised as multidimensional tables having more than three dimensions.

What is claimed is:

1. A method for processing one or a plurality of absolute cell references or cell range references during a copy/cut and paste operation in a multi dimensional spreadsheet comprising a plurality of cells identified by addresses or names, said method comprising the steps of:

selecting a source cell range to cut and paste or to copy and paste into a destination cell range;

storing in a working buffer the content of each cell that belongs to said source cell range;

clearing the content of each cell that belongs to a source cell range to cut;

for each cell stored in the working buffer;

if the content of the stored cell comprises one or a plurality of absolute references pointing to a cell or a cell range belonging to the source cell range:

determining for each of said cells or cell ranges pointed by an absolute reference and belonging to the source cell range, a relative position within the source cell range;

determining for each of said relative position within the source cell range, a corresponding absolute reference within the destination cell range;

replacing within the stored cell, each absolute reference pointing to a cell or a cell range belonging to the source cell range by the corresponding absolute reference within the destination cell range;

copying the content of each cell stored in the buffer to corresponding cells within the destination cell range.

2. A system adapted for carrying out the method for processing one or a plurality of absolute cell references or cell range references during a copy/cut and paste operation in a multi dimensional spreadsheet comprising a plurality of cells identified by addresses or names, comprising:

means for selecting a source cell range to cut and paste or to copy and paste into a destination cell range;

means for storing in a working buffer the content of each cell that belongs to said source cell range;

means for clearing the content of each cell that belongs to a source cell range to cut;

for each cell stored in the working buffer, if the content of the stored cell comprises one or a plurality of absolute references pointing to a cell or a cell range belonging to the source cell range:

means for determining for each of said cells or cell ranges pointed by an absolute reference and belonging to the source cell range, a relative position within the source cell range;

means for determining for each of said relative position within the source cell range, a corresponding absolute reference within the destination cell range; and     means for replacing within the stored cell, each absolute reference pointing to a cell or a cell range belonging to the source cell range by the corresponding absolute reference within the destination cell range; and means for copying the content of each cell stored in the buffer to corresponding cells within the destination cell range.

3. A computer readable medium comprising instructions which when executed, perform the method according to claim 1.

4. A method for processing one or a plurality of absolute cell references or cell range references during a copy/cut and paste operation in a multi dimensional spreadsheet comprising a plurality of cells identified by addresses or names, said method comprising the steps of:

copying a first cell found in a memory clipboard within a working buffer in memory;

parsing content of the memory working buffer;

performing a test to detect, while parsing, if any absolute reference is found within the content of the memory working buffer;

if any absolute reference is found, then:

performing a test on the absolute reference found to determine if the absolute reference points to a cell which is part of a cell range which has been cut or copied to the memory clipboard;

if yes, updating the content of the memory working buffer to change the absolute reference identified so that it points within a pasted range to a cell whose relative position within the pasted range matches the relative position of the original absolute reference within the source cell range;

copying the content of the memory working buffer within the pasted cell range at the cell location matching the relative position of the last cell copied from the clipboard to the memory working buffer when an entire content of the memory working buffer has been parsed and all potential absolute references pointing within the source cell range have been updated.

* * * * *